United States Patent [19]

Wickens

[11] Patent Number: 5,441,642
[45] Date of Patent: Aug. 15, 1995

[54] METHOD AND APPARATUS FOR CONTROLLED BIOLOGICAL TREATMENT OF WASTE WATER

[75] Inventor: Denys Wickens, Kellyville, Australia

[73] Assignee: The Commonwealth Industrial Gases Limited, Australia

[21] Appl. No.: 263,696

[22] Filed: Jun. 22, 1994

[30] Foreign Application Priority Data

Jun. 24, 1993 [AU] Australia ............... PL9606

[51] Int. Cl.⁶ .................................................. C02F 3/04
[52] U.S. Cl. ..................... 210/614; 210/615; 210/622; 210/96.1; 210/101; 210/151
[58] Field of Search ............... 210/620, 622, 627, 614, 210/603, 615, 150, 151, 96.1, 101, 195.1, 196

[56] References Cited

U.S. PATENT DOCUMENTS

| | | | |
|---|---|---|---|
| 2,366,917 | 1/1945 | Levine | 210/151 |
| 3,623,976 | 11/1971 | Cessna | 210/622 |
| 4,192,742 | 3/1980 | Bernard et al. | 210/614 |
| 4,255,266 | 3/1981 | Moreaud et al. | 210/614 |
| 4,869,824 | 9/1989 | Melin et al. | 210/151 |
| 5,019,266 | 5/1991 | Soeder et al. | 210/614 |
| 5,094,752 | 3/1992 | Davis et al. | 210/620 |
| 5,106,511 | 4/1992 | Kodukula | 210/96.1 |
| 5,332,502 | 7/1994 | Wickens et al. | 210/614 |

FOREIGN PATENT DOCUMENTS

| | | | |
|---|---|---|---|
| 7952076 | 5/1980 | Australia | |
| 0889185 | 12/1981 | Belgium | |
| 2470094 | 6/1981 | France | C02F 3/04 |
| 2329279 | 2/1975 | Germany | C02C 1/04 |
| 3128439 | 2/1983 | Germany | 210/614 |
| 57-75190 | 5/1982 | Japan | 210/614 |
| 62-98256 | 5/1987 | Japan | 210/620 |

OTHER PUBLICATIONS

"Oases is Oxygen in Wastewater Treatment." Air Products and Chemicals Brochure. Sep. 28, 1973.
English Abstract of DT-2 329 279 published Feb. 1, 1975.
English Abstract of SU 397 481 published Jan. 21, 1974.
English Abstract of BE-889 185 published Dec. 11, 1981.
English Abstract of FR 2 470 094 published Jun. 5, 1981.
Abstract of EP 10 473 corresponding to AU 52 076/79 published May 1, 1980.
English Abstract of JP A-54-144758 published Nov. 11, 1979.
English Abstract of SU 614-029 published Jun. 2, 1978.
English Abstract of JP 52-19468 published Feb. 14, 1977.

*Primary Examiner*—Peter A. Hruskoci
*Assistant Examiner*—Theodore M. Green
*Attorney, Agent, or Firm*—David A. Draegert; R. Hain Swope; Larry R. Cassett

[57] ABSTRACT

A method and apparatus (1) for the control of biological treatment of waste water in which waste water is fed to a substantially air tight supported growth biological filter unit (2) that includes an exhaust gas vent (5). Dissolved oxygen is supplied to the filter unit and the oxygen consumption rate across the filter is measured by comparing the flow rate of oxygen into the filter (2) to the flow rate of oxygen exiting the filter through the gas vent (5). The feed rate of waste water is adjusted to maintain a predetermined oxygen consumption, thereby controlling the effluent quality.

21 Claims, 1 Drawing Sheet

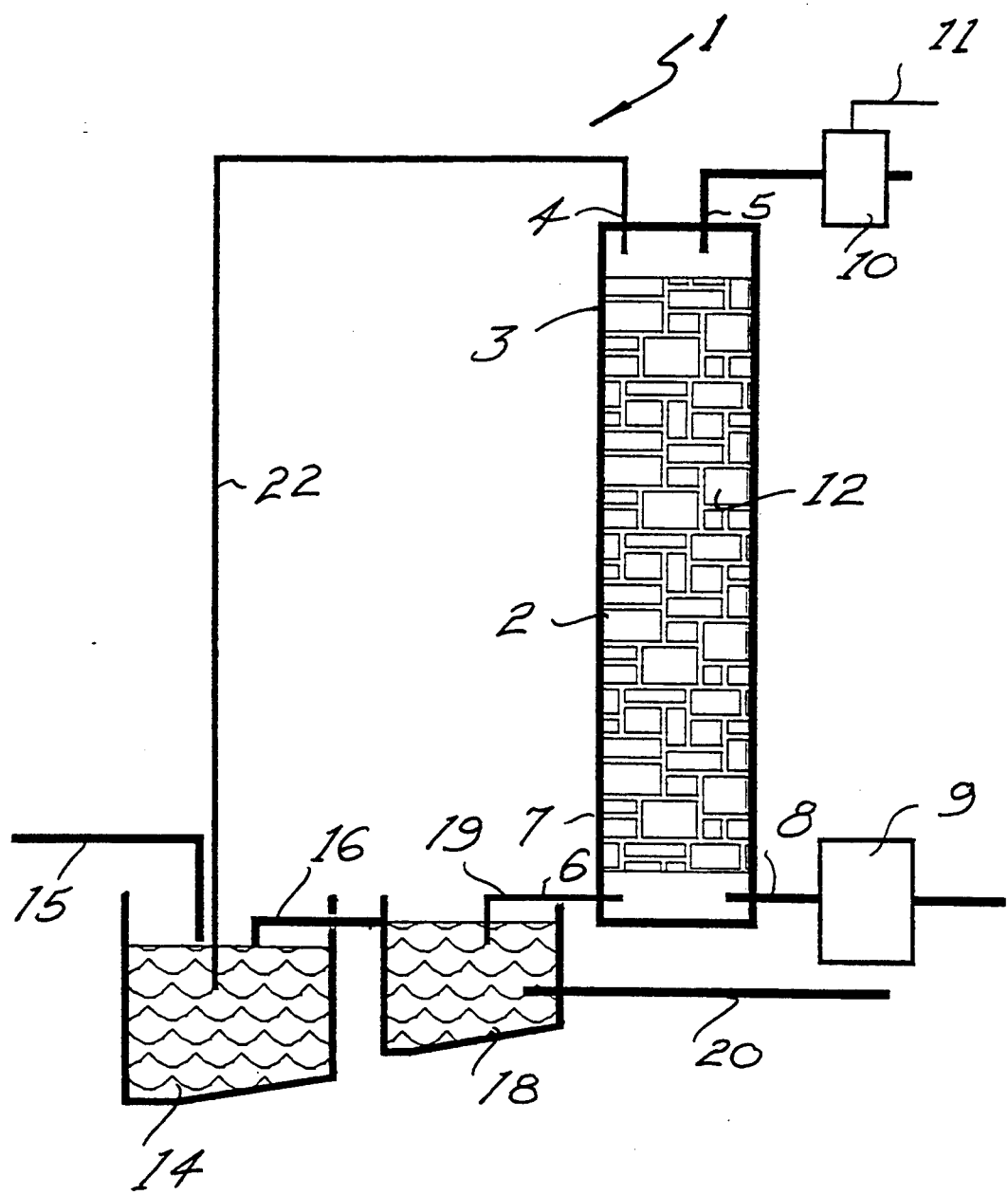

METHOD AND APPARATUS FOR CONTROLLED BIOLOGICAL TREATMENT OF WASTE WATER

TECHNICAL FIELD

The present invention relates to a method and apparatus for controlled biological treatment of waste water.

The method and apparatus have been developed primarily for use in the treatment of sewage and will be described hereinafter with reference to this particular field. However, it will be appreciated that the invention is also applicable to the biological treatment of other forms of waste.

BACKGROUND INFORMATION

Essentially, there are two general types of aerobic waste water treatment processes.

The first is commonly known as the activated sludge or suspended growth system. In this process, dissolved oxygen is fed into a storage tank of sludge to be treated, biomass forming as free-floating colonies or aggregates known as "flocs". A clarification stage is usually added to this process to separate these flocs or sludge from the liquid component.

If necessary, some of the sludge is periodically removed to prevent excessive solids build-up. Recycling is also practiced, principally to selectively increase the residence time of the biomass over the hydraulic residence time. In this manner real time control of activated sludge systems is limited to flow control of the recycle sludge to maintain solids at constant levels, and control of dissolved oxygen injected into the system to reduce operating costs.

The major problem with these type of systems are that they are generally designed for maximum capacity and further that the effluent quality can not readily be controlled.

The other kind of treatment process is known as the supported growth system where the biomass grows on biologically inactive support material. When the layer of biomass gets past a certain thickness, some of the sludge is sheared off or sloughed and this debris has to be removed from the final effluent by a clarification stage. Recycling is generally also practiced to increase the liquid/biomass contact and to dilute the incoming fluid with a partially treated liquid. Real time control of supported growth systems has also not proved practical in the past.

In summary, the key differences between activated sludge processes and other biological waste water treatment processes is that, operated in accordance with the present art, only the activated sludge process can be operated to give a reasonable assurance of meeting set effluent standards in the face of considerably fluctuating feed loadings. Other systems, such as supported growth units, and lagoons, have been capable to date of only removing a constant proportion of the pollution feed rather than meeting with a predetermined effluent quality.

This means that all existing systems have to be designed either with gross excess capacity, or as multiple units in series, or to a combination of both of these principles. Although the activated sludge process is known to carry appreciable cost penalties both directly in power and construction cost, and indirectly in quantity and quality of process monitoring and control required, its ability to absorb surges in load has, for the last few years, made this the standard process chosen for waste water treatment.

However, the selected activated sludge process has an additional pronounced disadvantage in that intermediate levels of treatment are only possible under conditions that also make large quantities of sludge. Accordingly, such systems are far from ideal where discharges are to be controlled at intermediate standards, such as for discharge to a sewer, or where some level of pretreatment is desired to reduce overloading, or to introduce biological nutrient removal at an existing plant.

There is therefore a need for a process that reliably and simply delivers an intermediate level of treatment without generating very large quantities of sludge.

SUMMARY OF THE INVENTION

It is an object of the present invention to provide an apparatus and method for controlling biological treatment of waste water that overcomes or at least ameliorates one or more of the above discussed disadvantages of the prior art.

According to a first aspect of the invention there is provided a method for controlled biological treatment of waste water comprising the steps of:

feeding waste water to a substantially airtight supported growth biological filter unit that includes an exhaust gas vent, supplying gaseous oxygen to said filter unit, measuring the oxygen consumption across said filter by comparing the flow rate of oxygen into the filter to the flow rate of oxygen exiting the filter through said gas vent, and adjusting the feed rate of waste water to maintain a predetermined oxygen consumption.

Preferably the oxygen consumption is determined by measuring the flow rate of gas venting from the biological filter unit and determining its oxygen mole fraction and subtracting the product of these values from the measured feed rate of dissolved oxygen into the filter unit.

Desirably, the filter is maintained at a pressure slightly above atmospheric pressure to prevent back-diffusion of air into the unit.

In a preferred embodiment waste water is fed to the upper portion of the filter unit and treated effluent exits the filter into a first reservoir from which the product is optionally clarified and/or combined with the infeed to the filter unit to be recycled. Desirably, the recycle is adjusted until the filter unit oxygen consumption is at its design set point.

According to a second aspect of the invention there is provided an apparatus for control of biological treatment of waste water, said apparatus comprising:

a substantially air tight supported growth biological filter unit having a liquid inlet, liquid outlet and exhaust gas vent;

means to supply gaseous oxygen to said filter unit;

means to measure oxygen flow rate into the filter and oxygen flow rate exiting the gas vent;

feed means responsive to a command signal to deliver a predetermined flow rate of waste water to the filter unit; and control means to compare the flow rate of oxygen into the filter and out of the gas vent to determine the oxygen consumption across the filter and generate a command signal to adjust the feed means to maintain a predetermined oxygen consumption.

Preferably, the filter unit includes means to maintain an internal pressure above atmospheric pressure to prevent back-diffusion of air into the unit.

In a preferred form, the apparatus includes a reservoir connected to an outlet of the filter unit. In a preferred form this includes a wet well which is preferably gravity fed from an outlet adjacent the base of the filter unit. Desirably, the reservoir also includes a combined sump preferably adapted to receive recycle waste water, desirably under gravity from the filter unit directly or via the wet well as well as an infeed of untreated waste water.

Preferably, the feed means to the filter unit is disposed to extract combined recycle waste and untreated waste from the combined sump.

Desirably, a clarifier or other purification or disposal means is connected with the wet well and is adapted to receive a portion of the liquid flow therefrom.

BRIEF DESCRIPTION OF THE DRAWING

The FIGURE is a schematic diagram of an apparatus embodying the invention.

DESCRIPTION OF THE PREFERRED EMBODIMENTS

A preferred embodiment of the invention will now be described, by way of example only, with reference to the accompanying drawing which is a schematic sectional side view of an apparatus for control of biological treatment of waste water.

The apparatus 1 comprises substantially air tight supported growth biological filter unit 2 having disposed in an upper portion 3 a liquid inlet 4 and an exhaust gas vent 5. A liquid outlet 6 is provided in a lower portion 7 of the filter unit 2 along with a gaseous oxygen inlet 8 which is connected with oxygen metering means 9. The exhaust gas vent 5 includes an in-line flow metering means 10 and an extraction point for an oxygen analyser 11. The vent also includes a one way valve (not shown).

The filter unit 2 is filled with a suitable proprietary or non-proprietary packing material 12 selected to increase the surface area within the filter without causing flooding or ponding.

The apparatus 1 also includes a combined sump 14 adapted to receive untreated waste through an inlet 15 and, optionally, recycle waste water via a gravity feed conduit 16.

A wet well 18 is disposed intermediate to the filter unit 2 and the combined sump 14 to receive treated waste water from the filter unit 2 via a further gravity feed conduit 19. The wet well 18 includes an outlet 20 which can optionally be connected to a clarifier, other treatment means or disposal means as required.

Feed means in the form of pipe 22 and pump (not shown) extends between the combined sump 14 and filter unit liquid inlet 4.

The infeed means 22, oxygen metering means 9, flow metering means 10 and oxygen analyser 11 are all connected to a central control unit (not shown).

In use, the untreated waste water requiring treatment is fed through inlet 15 into the combined sump 14 where it is mixed with filtered recycle fluid via gravity feed 16 which has already been at least partially treated in the biological filter unit 2. The mixture is then pumped to the top of the filter unit 2 via feed means 22 where it is distributed over the packing material 12 by any suitable known distribution means. The waste water then trickles down over the packing material 12 and accumulated supported biomass. During this contact, part of the pollution is removed from the waste water and converted into products of respiration including carbon dioxide, water and excess biomass.

The flow of partly treated water (plus any sloughed biomass) passes by gravity through the first gravity feed 19 to the wet well 18, whereby a smaller flow of liquid is optionally pumped through outlet 20 into a clarifier or other disposal or purification means. The rest of the treated waste overflows through gravity feed 16 into the combined sump 14 for recycle around the process. The recycle rate is predetermined based on the oxygen consumption rate.

During the filtration process, substantially pure oxygen is fed into the filter unit via oxygen metering means 9 which then directs the oxygen through inlet 8.

The substantially pure oxygen enhances the aerobic digestion process, excess oxygen exiting the filter unit via the exhaust gas vent 5 along with stripped gases such as carbon dioxide and nitrogen. Typical vent gas purities are expected to be in the range of approximately 40%–50% oxygen.

Real time control of both the oxygen supply and demand is achieved by measuring the oxygen consumption rate across the biological filter unit 2. The main control loop uses the ratio of oxygen consumption to liquid flow through the feed means 22 (a controlled variable) to determine the filter plant biological demand ($BOD_f$) of the infeed/recycle liquid. The feed rate through feed pipe 22 is adjusted until the $BOD_f$ is at its set point.

The $BOD_f$ is determined empirically for each unit and the particular type of waste water that is to be processed, since this is decided in part by the reaction constants for each waste water composition.

Two subsidiary control loops adjust the oxygen feed rate into the inlet 8 to maintain a predetermined level of oxygen in the exhaust gas from the filter unit that passes through vent 5 and control the flow rate through the vent opening to protect the filter unit from being exposed to excessive pressure.

The oxygen consumption rate is calculated by the control unit and is derived from the oxygen feed rate, and the product of the vent gas flow rate and its oxygen mole fraction. If oxygen from a source known to deviate significantly from 100% purity is used, its composition may be assumed (if steady) or measured if known to be varying. One such source is oxygen derived from air by the pressure swing absorption process.

Non-linear response of the filter to changes in hydraulic loading do not effect the nature of the control system described, but may change tolerable settings of the values used to determine the response to the change (typically deadband and proportional, integral and derivative terms).

By supplying a suitable storage tank, either raw untreated feed, part treated waste water, or a mixture of both may be diverted to prevent the need to discharge off-specification fluids. This need arises because no unit can cope with all possible flow eventualities and still be cost effectively constructed. If, say, a unit were normally designed for the 99.7 percentile demand, 0.3% of the time off-specification product would be discharged from an uncontrolled unit. However, with the apparatus of the invention the $BOD_f$ of the treated effluent from the filter unit is known, so off-specification product could be diverted until the unit could cope.

It will be appreciated that the wet well 18 may be a discrete unit or device, or may be a physically enclosed zone within the combined sump 14 and defined by barriers, the presence of the return liquid gravity feed 19 and the absence of the untreated waste water inlet 15.

One of the major advantages conferred by the method and apparatus of the invention is that the effluent quality is measured as it is produced and off-specification effluent may be detected and stored for re-work instead of being unknowingly discharged through the system.

There is also the facility to set intermediate levels of effluent qualities for discharge to sewers, to tertiary treatment processes, or to relieve overload in secondary treatment processes. Conversely, in prior art supported growth units and lagoons, it was only possible to remove a constant proportion of the pollution in the feed.

Furthermore, the use of substantially pure oxygen as opposed to air permits the use of smaller treatment units due to the higher driving force for oxygen dissolution.

It will also be appreciated that the system is resistant to variation in both flow rate and composition of the untreated waste. The process may be designed and operated to reduce the pollutant load only as far as is needed, instead of conducting the process uneconomically the majority of the time, merely to protect against peak loads.

With the embodiment described, there is also the option of operating the clarification step at a constant flow as this is not directly dependent on the flow rate through the filter unit. There is also the realistic option of sealing the apparatus as a whole with mesh to protect against filter flies. This option is not always practically possible with many of the prior art systems.

While the foregoing description relates to a specific embodiment, it will be appreciated by those skilled in the art that the invention may be embodied in many other forms.

I claim:

1. A method for controlled biological treatment of waste water comprising the steps of:
   (a) feeding waste water to a substantially airtight supported growth biological filter unit that includes an exhaust gas vent,
   (b) supplying gaseous oxygen to the filter unit,
   (c) measuring the oxygen consumption across the filter by comparing the flow rate of oxygen into the filter to the flow rate of oxygen exiting the filter through said gas vent, and
   (d) adjusting the feed rate of waste water to maintain a predetermined oxygen consumption.

2. A method according to claim 1 wherein the oxygen consumption rate is determined by measuring the flow rate of gas venting from the biological filter unit and determining its oxygen mole fraction and subtracting the product of these values from the measured feed rate of dissolved oxygen into the filter unit.

3. A method according to claim 1 including the further step of maintaining the filter unit at a pressure slightly above atmospheric pressure to prevent back-diffusion of air into the unit.

4. A method according to claim 1 wherein waste water is fed to the upper portion of the filter unit and treated effluent exists the filter into a reservoir.

5. A method according to claim 4 wherein a stream of treated waste water is extracted from the reservoir for clarification.

6. A method according to claim 4 wherein a portion of the treated effluent in the reservoir is combined with the infeed of waste water to the filter unit to be recycled.

7. A method according to claim 6 wherein in the recycle rate is adjusted until the filter unit oxygen consumption is at its design set point.

8. A method according to claim 6 wherein the oxygen consumption rate is determined by measuring the flow rate of gas venting from the biological filter unit and determining its oxygen mole fraction and subtracting the product of these values from the measured feed rate of dissolved oxygen into the filter unit.

9. A method according to claim 8 including the further step of maintaining the filter unit at a pressure slightly above atmospheric pressure to prevent back-diffusion of air into the unit.

10. An apparatus for control of biological treatment of waste water, said apparatus comprising:
    (a) a substantially air tight supported growth biological filter unit having a liquid inlet, liquid outlet and exhaust gas vent;
    (b) means for supplying gaseous oxygen to said filter unit;
    (c) means for measuring oxygen flow rate into the filter and oxygen flow rate exiting the gas vent;
    (d) feed means responsive to a command signal for delivering a predetermined flow rate of waste water to the filter unit; and
    (e) control means for comparing the flow rate of oxygen into the filter and out of the gas vent to determine the oxygen consumption across the filter and generating a command signal to adjust the feed means to maintain a predetermined oxygen consumption.

11. An apparatus according to claim 10 wherein the filter unit includes means for maintaining an internal pressure above atmospheric pressure to prevent back-diffusion of air into the filter unit.

12. An apparatus according to claim 10 wherein the liquid inlet is disposed in the upper portion of the filter unit and a reservoir is provided in a fluid flow communication with the filter unit liquid outlet.

13. An apparatus according to claim 12 including a clarification stage connected with an outlet from the reservoir.

14. A apparatus according to claim 12 including means for combining a portion of the treated effluent in the reservoir with the infeed of waste water to the filter unit.

15. An apparatus according to claim 12 wherein the reservoir includes a wet well which is gravity fed from an outlet adjacent the base of the filter unit.

16. An apparatus according to claim 15 further including treatment means connected to the wet well and adapted to receive a portion of the liquid flow therefrom.

17. An apparatus according to claim 15 wherein the reservoir includes a combined sump adapted to receive recycle waste water from the wet well and untreated waste.

18. An apparatus according to claim 17 wherein the feed means to the filter unit are disposed to extract combined recycled waste and untreated waste from the combined sump.

19. An apparatus according to claim 15 wherein the treatment means comprises a clarifier.

20. An apparatus according to claim 12 wherein the reservoir includes a combined sump adapted to receive recycle waste water from the filter unit and untreated waste.

21. An apparatus according to claim 16 wherein the feed means to the filter unit are disposed to extract combined recycled waste and untreated waste from the combined sump.

* * * * *